US009569296B2

(12) United States Patent
Hu et al.

(10) Patent No.: US 9,569,296 B2
(45) Date of Patent: Feb. 14, 2017

(54) RECEIVER BIT ALIGNMENT FOR MULTI-LANE ASYNCHRONOUS HIGH-SPEED DATA INTERFACE

(71) Applicant: NEC Laboratories America, Inc., Princeton, NJ (US)

(72) Inventors: Junqiang Hu, Davis, CA (US); Ting Wang, West Windsor, NJ (US); Sadaichiro Ogushi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 213 days.

(21) Appl. No.: 14/293,570

(22) Filed: Jun. 2, 2014

(65) Prior Publication Data

US 2014/0365835 A1 Dec. 11, 2014

Related U.S. Application Data

(60) Provisional application No. 61/831,281, filed on Jun. 5, 2013.

(51) Int. Cl.
*G06F 11/00* (2006.01)
*G06F 11/07* (2006.01)
*G06F 7/58* (2006.01)

(52) U.S. Cl.
CPC .............. *G06F 11/076* (2013.01); *G06F 7/58* (2013.01); *G06F 11/0745* (2013.01)

(58) Field of Classification Search
CPC ...... G06F 11/076; G06F 11/0745; G06F 7/58; G06F 11/0754
USPC ....... 714/700, 704, 705, 728–729, 726, 736, 714/739, 746
See application file for complete search history.

(56) References Cited

U.S. PATENT DOCUMENTS

| 7,231,558 | B2 * | 6/2007 | Gentieu | .................. H04L 1/243 |
| | | | | 714/704 |
| 8,045,663 | B2 * | 10/2011 | Bae | ........................ G11O 5/063 |
| | | | | 375/355 |
| 8,649,271 | B2 * | 2/2014 | Jackson | ............. H04L 12/2697 |
| | | | | 370/241 |
| 8,725,976 | B2 * | 5/2014 | Cho | ........................ G06F 15/18 |
| | | | | 711/105 |

* cited by examiner

*Primary Examiner* — Christine Tu
(74) *Attorney, Agent, or Firm* — Joseph Kolodka

(57) ABSTRACT

The invention uses a PRBS pattern generated by transmitter (serializer) as training. At the receiver side, following receiver outputs, a synchronous capturing module is used to capture multiple lanes simultaneously. The captured data is used to calculate the PRBS distance for different lanes. After the distances are obtained, the one with largest latency is used as a reference, to calculate the relative latency with each other lane. This relative latency is further used to calculate the number of shifts for Barrel Shifter and word shifter.

12 Claims, 4 Drawing Sheets

RECEIVER BIT ALIGNMENT FOR MULTI-LANE ASYNCHRONOUS HIGH-SPEED DATA INTERFACE

RELATED APPLICATION INFORMATION

This application claims priority to provisional application No. 61/831,281 entitled "Receiver bit alignment method for multi-lane asynchronous high-speed data interface", filed Jun. 5, 2013, the contents thereof are incorporated herein by reference.

BACKGROUND OF THE INVENTION

The present invention relates generally to optics, and more particularly, to bit alignment method for high data rate multi-lane data exchanging, for either inter-device or inter-system interfaces.

The present invention is related to Because of the factors like higher processing capacity of a single device, larger volume of network data throughput, and the innovations in data acquisition/waveform generation, data exchanging rate is much higher than before, that easily goes up to hundreds-Gigabit per second per device. For example, a 6 bit, 56 Gsample/second (56 GS/s) analog-to-digital converter (ADC) will generate 56 G*6 bit=336 Gb/s from a single channel.

Due to limited number of I/Os, higher interface capacity is usually achieved by increasing the data rate of each lane. The common data rate currently in use is 10.3~13 Gb/s per lane, and looking forward to 25~28 Gb/s. Such data rate is not possible by using the conventional source synchronous approach which requires the signals aligned to each other and latched in receiver device by a single clock. Instead, a clock/data recovery (CDR) unit is always included in the receiver interface for each lane, to recover both the clock and data signal from input data stream with provided reference clock. Serial-to-parallel converter (for transmitter) or parallel-to-serial converter (for receiver) is used to bridge the high-speed interface and lower speed processing, so such interface is also called SerDes (Serializer/Deserializer). Three factors make random delay from transmitter input to receiver output: 1) the nature of CDR causes random phase in the recovered data, which makes the data up to one UI (unit interval) earlier or later after each reset; 2) without serializer/deserializer synchronous reset, there will be bit skew up to parallel word width among different lanes; 3) PCB trace skew because of material and trace length.

When multiple high-speed SerDes lanes are used as a bundle, applications usually have data aligned among the lanes at transmitter, and require same pattern/alignment outputted from receiver. For another application, not only the bits among different lanes need to be aligned, but also that the receiver parallel data output shall be word-aligned with transmitter side. The solution to guarantee these alignments at receiver outputs is the problem that the present invention attempts to solve.

So far there are two categories of approaches available: one for packet interface such as 40 G/100 G Ethernet (IEEE 802.3ba-2010, "Amendment 4: Media Access Control Parameters, Physical Layers, and Management Parameters for 40 Gb/s and 100 Gb/s Operation", section 82.2) and Interlaken ("Interlaken Protocol Definition", Cortina Systems and Cisco Systems, rev. 1.2, section 5.4), and another for data stream interface such as receiver at digital-to-analog converter (DAC).

We use Interlaken as example to explain the widely used approach for packet case. There are two steps for lane alignments: first step is to find word boundary, and second step is for overall alignment. The first step is achieved by using 64B/67B encoding, through which the receiver (in particular 64B/67B decoding unit) looks for the control or flag code of the 3-bit overhead, to determine the word boundary. The second step is using synchronization pattern for overall alignment, which is identified by a special flag in the 3 bit overhead field. This solution not only guarantees bit-level alignment for all the lanes, but also achieves word-alignment with transmitter. The problem for this solution is that it requires additional overhead which increases data rate.

One solution for data stream alignment is seen in MICRAM's company confidential document, which aligns every two lanes using identical pattern. One suggested solution is using PRBS (Pseudo-Random Bit Sequence), and then to shift one lane bit-by-bit until it is aligned (no difference detected) or reaches a threshold (the maximum number of shifts). When threshold is reached, it requires tuning the other lane or reversing the tuning direction. This solution requires bit-by-bit adjustment, which is only possible using hardware implementation to achieve acceptable aligning speed. Moreover, this approach is not reliable when the signal received is not error free, for which case "unmatch" may always be encountered even when the two lanes are actually aligned.

Accordingly, there is a need for a latching WSS/WB the can be used in reconfigurable BU in submarine network, that overcomes the shortcomings of prior efforts.

BRIEF SUMMARY OF THE INVENTION

The present invention is directed to a system including multiple transmitters each with a pseudorandom binary sequence PRBS generator for providing a training pattern and selection logic for selecting either the training pattern during a training phase or regular data and passing the selection onto serial lanes, and multiple receivers each with a synchronous capturing module for capturing multiple ones of the serial lanes with data simultaneously, the captured data being used to calculate a PRBS distance or bit skew for different lanes, of the distances calculated the distance with the largest latency is used as a reference to calculate a relative latency to other lanes, the relative latency is used to calculate a number of shifts for at least one of a barrel shifter and word shifter in the receiver, wherein the transmitter and receiver cooperate to provide receiver bit alignment for multi-lane asynchronous high speed data interface between the transmitters and receivers.

In an alternative expression of the invention, a method includes providing a training pattern and selection logic for selecting either a training pattern during a training phase or regular data and passing the selection onto serial lanes, employing multiple transmitters each with a pseudorandom binary sequence PRBS generator for providing the training pattern, and capturing multiple ones of the serial lanes with data simultaneously, with multiple receivers each with a synchronous capturing module, the captured data being used to calculate a PRBS distance or bit skew for different lanes, of the distances calculated the distance with the largest latency is used as a reference to calculate a relative latency to other lanes, the relative latency is used to calculate a number of shifts for at least one of a barrel shifter and word shifter in the receiver, wherein the transmitter and receiver cooperate to provide receiver bit alignment for multi-lane asynchronous high speed data interface between the transmitters and receivers.

These and other advantages of the invention will be apparent to those of ordinary skill in the art by reference to the following detailed description and the accompanying drawings.

DETAILED DESCRIPTION

The present invention has several key elements to solve the described problem: PRBS generator in transmitter side; PRBS distance calculator at receiver outputs; Barrel Shifter for word boundary alignment, and configurable stages of word shifter for word skew adjustment.

The present invention uses a pseudorandom binary sequence PRBS pattern generated by transmitter (serializer) as training. At the receiver side, following receiver outputs, a synchronous capturing module is used to capture multiple lanes simultaneously. The captured data is used to calculate the PRBS distance (i.e., the bit skew) for different lanes. For example, if captured data in lane i is A, and lane j is B; we use A as PRBS shift register initial value to calculate the number of shifts n to reach B, then n is the distance from A to B, or say j is n bit later than lane i. Because of PRBS pattern's periodical nature, the actual latency needs to be adjusted from n which will be given in the detailed description. After the distances are obtained, the one with largest latency is used as reference, to calculate the relative latency with each other lane. This relative latency is further used to calculate the number of shifts for Barrel Shifter and word shifter.

If the receivers are expected to have same word alignment as transmitters, another periodic training pattern with length equal to parallel word length is used for Barrel Shifter tuning, and then PRBS pattern is used for word shifter adjustment.

Figure 1:
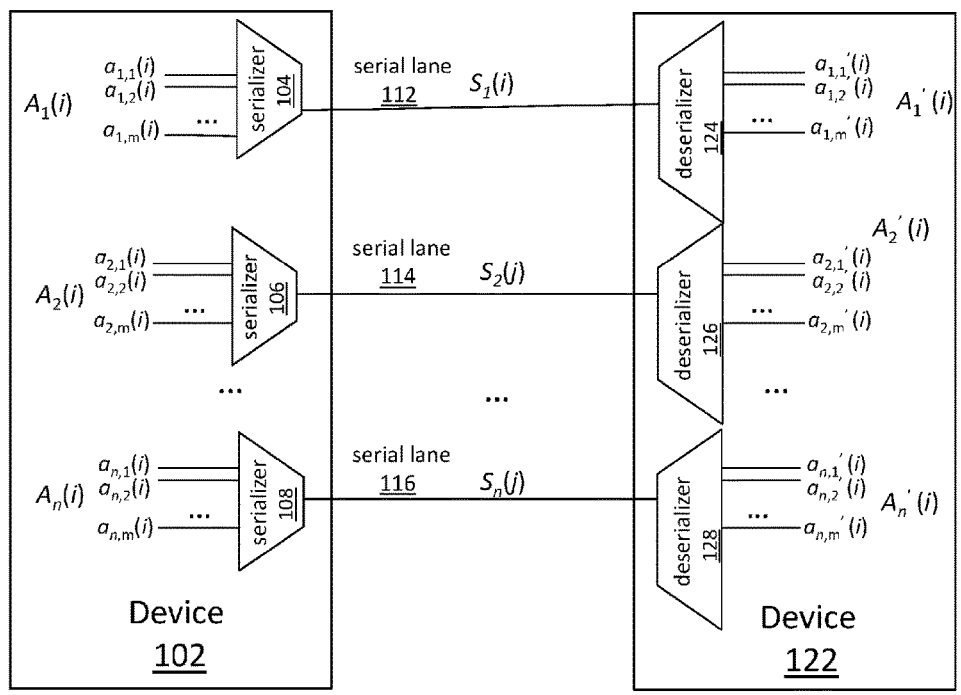
FIG. 1 is diagram of an exemplary system configuration showing required system connection and I/O sequence for which the present invention is applicable.

FIG. 1 is the system architecture and bit/word sequence that describes the requirement. There are n high-speed serial lanes (for example lane 112, 114, and 116) connecting the two devices 102 and 122. Device 102 has n transmitters, each multiplexing m bit parallel data into serial by serializers such as 104, 106, and 108. The serial lanes 112, 114, and 116 are either PCB traces or cables. Device 122 has n receivers, each having a deserializer such as 124, 126, and 128, to convert from serial bit stream into parallel word. Each receiver may have a CDR module as well which is not shown in this figure. The requirement for receiver side outputs is: assume the word sequence at the transmitter side parallel inputs is $A_k(i)$ (for lane k, time i), while receiver output is $A_k'(j)$ (lane k, time j), then for all the lanes k=1, 2, ..., n, $A_k'(j)$ is p bit shift plus q-word shift from $A_k(i)$, where p∈[0, m−1] and q is any integer. This can also be explained as: each lane has the same number of bit delay comparing to its corresponding transmitter. For application that also requires same word alignment as transmitter, p=0.

Figure 2:
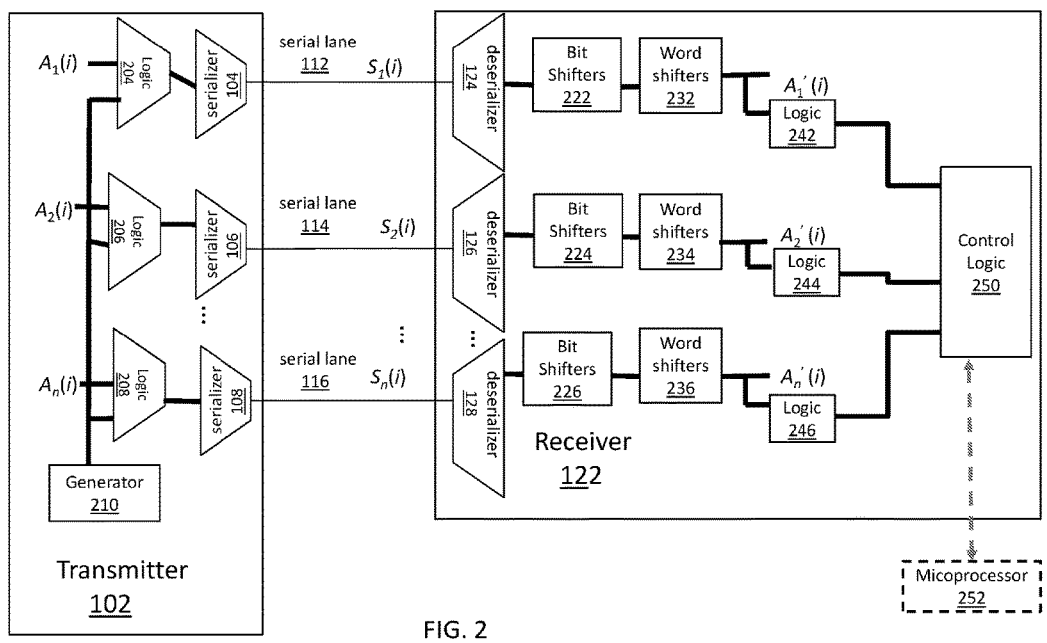
FIG. 2 is a system block diagram, in accordance with the invention.

FIG. 2 is the block diagram illustrating the present invention. For transmitter side, there are training pattern generator 210, and pattern selection logic such as 204, 206 and 208 added. Pattern selection logic selects either training pattern (during training phase, from 210) or the regular data $(A_1(i)$~$A_n(i))$ and pass to the serializer. In receiver side, the blocks related to alignment include: bit shifters (222, 224, 226) (which can be implemented using Barrel shifter), word shifters (232, 234, 236), synchronized capturing logic (242, 244, 246), and control logic 250 for the shifters and capturing logic. In addition, there can be microprocessor 252 involved which will be described below.

Training Pattern

For application that does not need receiver to be word aligned as transmitter side, PRBS can be used as training pattern for both Barrel shifter and word shifter adjustment. PRBS sequence length shall be larger than 2× maximum skew. For example, if maximum skew is 100 bit, then PRBS pattern shall be longer than 200 bit, which means L>7 for PRBS 2 L−1 where L is the PRBS shift register length. One example for such application is that a word is composed of one bit from each lane, like lane-1 for bit0, lane 2 for bit1, and so on.

For the other application that requires receiver word-aligned with transmitter, two patterns are needed from pattern generator, which represent two phases of the alignment. One pattern is periodic pattern with sequence length equal to parallel word width, for example 'b11000 . . . 0; another pattern is PRBS. The pattern of parallel word length is for the adjustment of Barrel Shifter for word alignment. For example when received pattern is 'b001100 . . . 0, then the receiver may have the Barrel Shifter shift-left for 2 bit to have 'b1100 . . . 0 which will be aligned with transmitter. The usage of PRBS is same as above except that the adjustment is for word shifter and after word alignment is achieved.

To avoid simultaneous logic switching for the internal logic and/or external I/O, the training pattern for each lane may be shifted, and such shifts shall be included in receiver shifting to be described below.

Bit Shifter

Figure 3:
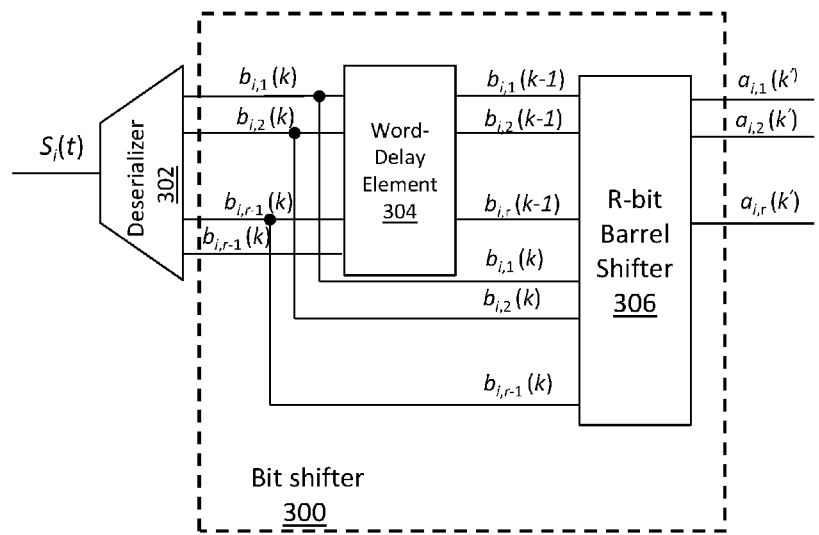
FIG. 3 is a block diagram of a 3 bit shifter, in accordance with the invention.

Assume the parallel data width is r. FIG. 3 is the block diagram related to bit shifter. Deserializer 302 demultiplexes input sequence $S_i(t)$ (where i is the serial lane number and t is discrete time) into parallel word $\{b_{i,1}(k), b_{i,2}(k), \ldots, b_{i,r}(k)\}$ where $b_{i,1}(k)$ represents MSB and is the earliest received bit. Bit shifter 300 contains a word-delay element 304 which delays the word to one clock cycle, and an r-bit Barrel Shifter 306 which takes 2×r−1 bits and may shift towards MSB for 0 to (r−1) bits, with $b_{i,1}(k)$ to $b_{i,r-1}(k)$ shifted in from LSBs. The inputs of 306 in FIG. 3 from top to bottom are in the order from earliest to latest bits, so each shift actually delays the sequence for one bit. Note that the bit arrangement and shifting direction described here are just for example, and they can be of other variations.

Word Shifter

Figure 4:
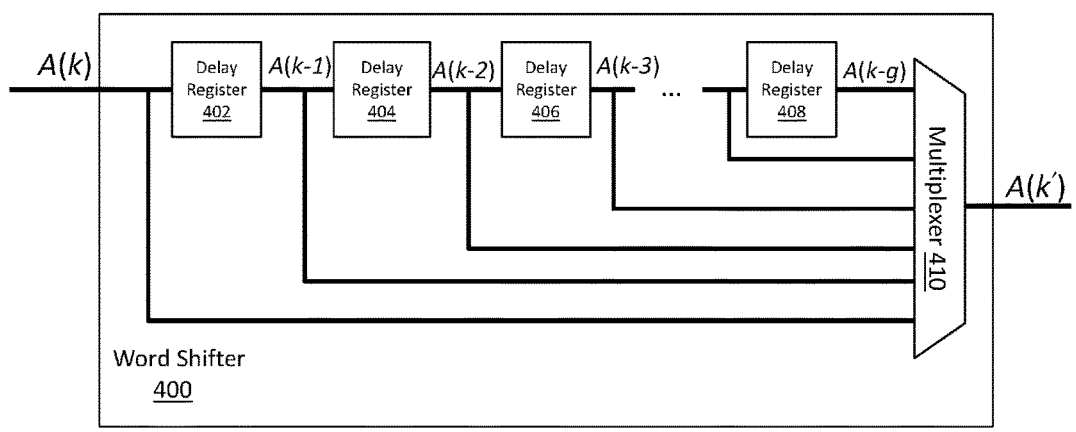
FIG. 4 is a block diagram of a word shifter, in accordance with the invention.

Word shifter is for the delay adjustment equal to or larger than one word (r-bit) length. This is shown in FIG. 4 which contains g-stage cascaded 1-word (r-bit) delay registers (402, 404, 406, 408) and multiplexer 410. In this figure, A(k−g) is g-word earlier than input A(k).

Synchronized Capturing Unit

Synchronized capturing units 242, 244, 246 in FIG. 2 captures one or multiple parallel words simultaneously under the control of capturing and shifting control logic 250.

The number of words w to capture depends on the PRBS shift register length L, to make sure that the captured length r*w is no less than L, so that it will be a unique location in the 2 L−1 bits PRBS sequence.

Capturing and Shifting Control Logic

This module generates the pulse that is synchronous to parallel clock to enable data capturing. Because of the random recovered phase for each lane, usually there is a buffer before the SerDes output for clock isolation. In this case, a single pulse can be distributed to all the lanes. When such clock isolation buffer is not used, the pulse to each lane need to be adjusted based on its clock phase difference, which will not be discussed in the present invention.

The shifting control is based on the calculation of relative bit latency among the lanes. This is done by loading the captured value $C_i$ from lane i, to calculate the number of cycles to reach the captured value $C_j$ from lane j. If the number of cycles c is within the pre-defined threshold (i.e., maximum skew), then lane j has larger delay than lane i and needs to be shifted forward. Otherwise, the logic may load $C_j$ into the PRBS shift register to calculate the cycles to reach or to use the PRBS sequence length 2 L−1 minus c as the latency. For bit error tolerance, multiple capturing/calculation may be performed to check the consistency. When the latencies are obtained, the logic looks for the earliest lane (or latest lane, depends on the shift direction) to use as reference, and then calculates the relative latency for other lanes. Assume the earliest lane is j, and the latency for lane i (i≠j) is $d_i$, then with the shifter arrangement mentioned above, the number of shifts for Barrel Shifter is $$(r-d_i\%r)\%r \quad \text{(Equation 1)}$$

where r is the parallel data width and "%" is modulo operation; the number of shifts for word shifter is given by $$\lfloor (d_i+(r-1))/r \rfloor \quad \text{(Equation 2)}$$

where '⌊ . . . ⌋' means "rounds down". The calculation can be done either by hardware 250 or by software running in a microprocessor 252.

When a receiver is to be word aligned with a transmitter, the Barrel Shifter adjustment is calculated by using periodic training pattern of parallel word length as mentioned above. After word alignment, training pattern generator 210 switches to PRBS pattern and then uses the same approach as above for word shifter adjustment.

Operating Procedure

The following gives the steps to achieve lane-alignment.

For an application that does not require word-alignment between transmitter and receiver:
1) Enable PRBS pattern outputs in transmitter device
2) Generate data capturing pulse(s) in receiver, to enable synchronous capturing for each parallel data of each lane
3) Read the captured data, and calculate the relative delay among the lanes
4) Look for the earliest lane (i.e., the one with lowest skew), and then use as reference to calculate the relative delay for the other lanes
5) Optional: repeat step 2) to 4) and check the consistency of results. If they are consistent, to go step 6), otherwise repeat step 2) to 4) to get the consistent (under expected confidence) result
6) Using equation 1 and 2 to calculate the number of shifts for Barrel Shifters and word shifters, and tune the shifters accordingly
7) Optional: capture the data again for all the lanes, and check the alignment. If not aligned, reset the system if necessary and repeat step 1) to 6)

For an application that requires word-alignment between transmitter and receiver:
1) Enable first training pattern which has same length as parallel word
2) Generate data capturing pulse(s) in receiver, to capture the data
3) For each lane, use the captured pattern to calculate the shifts needed for Barrel Shifter, to achieve word alignment with its corresponding transmitter
   a. Optionally, this can be done through bit-by-bit capturing-and-adjusting
4) Enable PRBS pattern outputs in transmitter device
5) Generate data capturing pulse(s) in receiver, to enable synchronous capturing for each parallel data of each lane
6) Read the captured data, and calculate the relative delay among the lanes
7) Look for the earliest lane (i.e., the one with lowest skew), and then as reference to calculate the relative delay for the other lanes
8) Optional: repeat step 5) to 7) and check the consistency of results. If they are consistent, to go step 9), otherwise repeat step 5) to 7) to get the consistent (under expected confidence) result
9) Using equation 2 to calculate the number of shifts for word shifters and tune accordingly
10) Optional: capture the data again for all the lanes, and check the alignment. If not aligned, reset the system if necessary and repeat step 1) to 9)

Note that the present invention not only applies to the transceiver with serializer/deserializer (SerDes) (which provides parallel/multi-bit input/output for user logic), but also to one without SerDes (i.e., serial interface for user logic).

From the foregoing it can be appreciated that this invention provides advantages that include its applicability to a high-speed streaming interface without overhead, which reduces data rate; it is suitable for software co-processing at reasonable speed which is much easier and consumes less logic than hardware logic implementation, which reduces both development cost and hardware cost.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A system comprising:
multiple transmitters each having a pseudorandom binary sequence (PRBS) generator for providing a training pattern, and a selection logic for selecting either the training pattern during a training phase or regular data and passing the selection onto a plurality of serial multi-lanes;
multiple receivers each having a synchronous capturing module for capturing multiple ones of the plurality of serial multi-lanes with data simultaneously, the captured data being used to calculate a PRBS distance or bit skew for each of the plurality of serial multi-lanes, where the PRBS distance with the largest latency is used as a reference to calculate a relative latency of each of the serial multi-lanes to other serial multi-lanes in the plurality of serial multi-lanes, the relative latency is used to calculate a number of shifts for at least one of a barrel shifter and word shifter in the receivers; and a bit shifter for each of the plurality of serial multi-lanes of at least one receiver, that shifts the number of data bits in a lane as a calculated relative latency to achieve alignment among each of the serial multi-lanes;

wherein the transmitters and the receivers cooperate to provide bit alignment for one or more serial multi-lane asynchronous high speed data interfaces between the transmitters and receivers;

wherein for the bit alignment between the receivers and the transmitters, two training patterns are provided, and represent two phases of alignment, one pattern being periodic pattern having a sequence length equal to parallel word width and another pattern being a PRBS pattern; and wherein each of the synchronous capturing modules comprise a PRBS shift register having a shift register length for capturing one or multiple parallel words simultaneously under control of capturing and shifting control logic, the number of words to capture depends on a PRBS shift register length to make sure that the captured length is no less than the shift register length, and a unique location in a bits PRBS sequence.

2. The system of claim 1, wherein each of the synchronous capturing modules comprise a shifting control is based on the calculation of relative bit latency among the lanes which is done by loading a captured value $C_i$ from lane i, to calculate a number of cycles to reach a captured value $C_j$ from lane j, if the number of cycles c is within a pre-defined threshold, such as a maximum skew, then lane j has a larger delay than lane i and is shifted forward.

3. The system of claim 2, wherein each of the synchronous capturing modules employs synchronous capturing logic to load $C_j$ into the PRBS shift register to calculate the cycles to reach $C_i$, or to use a PRBS sequence length $2^L-1$ minus a number of cycles c as the latency.

4. The system of claim 1, wherein each of the synchronous capturing modules, for bit error tolerance, performs multiple capturing/calculating to check consistency, when the latencies are obtained, looks for the earliest lane or latest lane, depending on the shift direction, to use as reference, and then calculates the relative latency for other lanes.

5. The system of claim 2, wherein each of the synchronous capturing modules performs the capturing by assuming that the earliest lane is j, and the latency for lane i (i≠j) is $d_i$, then the number of shifts for the barrel shifter is (r−$d_i$%r)%r where r is the parallel data width and "%" is modulo operation.

6. The system of claim 2, wherein each of the synchronous capturing modules performs the capturing by assuming that the earliest lane is j, and the latency for lane i (i≠j) is $d_i$, the number of shifts for word shifter is given by ⌊($d_i$+(r−1))/r⌋ where '⌊ . . . ⌋' means "rounds down", and where r is the parallel data width.

7. A method comprising the steps of:
providing a training pattern by a pseudorandom binary sequence (PRBS) generator in each of a plurality of transmitters;
selecting, by a selection logic in each of the plurality of transmitters, either the training pattern during a training phase or regular data, and passing the selection onto a plurality of serial multi-lanes and capturing multiple ones of the plurality of serial multi-lanes with data simultaneously, with multiple receivers each with a synchronous capturing module, the captured data being used to calculate a PRBS distance or bit skew for each of the plurality of serial multi-lanes, of the distances calculated the distance with the largest latency is used as a reference to calculate a relative latency of each of the serial multi-lanes to other serial multi lanes in the plurality of serial multi-lanes, the relative latency is used to calculate a number of shifts for at least one of a barrel shifter and word shifter in the receivers; and shifting bits of each lane of at least one receiver by the number of bits as a calculated relative latency to achieve alignment among each of the plurality of serial multi-lanes;

wherein the transmitters and receivers cooperate to provide receiver bit alignment for one or more serial multi-lane asynchronous high speed data interfaces between the transmitters and receivers;

wherein for the bit alignment between the receivers and the transmitters, two training patterns are provided, and represent two phases of alignment, one pattern being a periodic pattern with sequence length equal to parallel word width and another pattern being a PRBS pattern; and wherein each of the synchronous capturing modules comprise a PRBS shift register having a shift register length for capturing one or multiple parallel words simultaneously under control of capturing and shifting control logic, the number of words to capture depends on a PRBS shift register length to make sure that the captured length is no less than the shift register length, and a unique location in a bits PRBS sequence.

8. The method of claim 7, wherein each of the synchronous capturing modules comprise a shifting control is based on the calculation of relative bit latency among the lanes which is done by loading a captured value Ci from lane i, to calculate a number of cycles to reach a captured value $C_j$ from lane j, if the number of cycles c is within a pre-defined threshold, such as a maximum skew, then lane j has a larger delay than lane i and is shifted forward.

9. The method of claim 8, wherein each of the synchronous capturing modules employs synchronous capturing logic to load $C_j$ into the PRBS shift register to calculate the cycles to reach $C_i$, or to use a PRBS sequence length $2^L-1$ minus a number of cycles c as the latency.

10. The method of claim 7, comprising performing, for bit error tolerance, multiple capturing/calculating to check consistency, when the latencies are obtained, looking for the earliest lane or latest lane, depending on the shift direction, to use as reference, and then calculates the relative latency for other lanes.

11. The method of claim 8, wherein each of the synchronous capturing modules comprises assuming that the earliest lane is j, and the latency for lane i (i≠j) is $d_i$, then the number of shifts for the barrel shifter is (r−$d_1$%r)%r where r is the parallel data width and "%" is modulo operation.

12. The method of claim 8, wherein each of the synchronous capturing modules performs the capturing by assuming that the earliest lane is j, and the latency for lane i (i≠j) is $d_i$, the number of shifts for word shifter is given by ⌊($d_i$+(r−1))/r⌋ where '⌊ . . . ⌋' means "rounds down", and where r is the parallel data width.

* * * * *